United States Patent
Seshadri et al.

(10) Patent No.: US 10,237,378 B1
(45) Date of Patent: Mar. 19, 2019

(54) LOW-LATENCY METADATA-BASED PACKET REWRITER

(71) Applicant: Amazon Technologies, Inc., Seattle, WA (US)

(72) Inventors: Kiran Kalkunte Seshadri, Cedar Park, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 15/197,501

(22) Filed: Jun. 29, 2016

(51) Int. Cl.
| | |
|---|---|
| H04L 29/00 | (2006.01) |
| H04L 29/06 | (2006.01) |
| H04L 12/741 | (2013.01) |
| H04J 3/06 | (2006.01) |

(52) U.S. Cl.
CPC ............ *H04L 69/22* (2013.01); *H04J 3/0635* (2013.01); *H04L 45/74* (2013.01)

(58) Field of Classification Search
CPC ... H04L 45/74; H04L 45/745; H04L 47/6215; H04L 69/22; G06T 2207/30141; G02B 26/10; G06F 13/385; G06F 2213/3808; G06K 15/1204
See application file for complete search history.

(56) References Cited

U.S. PATENT DOCUMENTS

| | | | | |
|---|---|---|---|---|
| 5,964,867 A | * | 10/1999 | Anderson | G06F 8/4442 712/207 |
| 8,681,795 B1 | * | 3/2014 | Verwillow | H04L 69/22 370/392 |
| 9,948,756 B1 | * | 4/2018 | Seshadri | H04L 49/3063 |
| 2005/0180539 A1 | * | 8/2005 | De Gouy | G06F 7/68 377/47 |

* cited by examiner

*Primary Examiner* — Yemane Mesfin
*Assistant Examiner* — Mon Cheri S Davenport
(74) *Attorney, Agent, or Firm* — Kilpatrick Townsend & Stockton LLP

(57) ABSTRACT

Provided are systems, methods, and integrated circuits for a low-latency, metadata-based packet rewriter. In various implementations, an integrated circuit may include a first pipeline stage operable to receive packet bytes for a packet and packet information. The first stage may further be operable to extract a first value from the packet bytes, and provide the packet bytes, packet information, and first value. The integrated circuit may further include a second stage, operable to receive the packet bytes and packet information. The second stage may further calculate a value using a value from the packet information, and provide the packet bytes, packet information, and second value. The integrated circuit may further include a third stage, operable to receive the packet bytes, packet information, and a third value. The third stage may further be operable to insert the third value into the packet bytes, and provide the packet bytes and packet information.

23 Claims, 10 Drawing Sheets

US 10,237,378 B1

LOW-LATENCY METADATA-BASED PACKET REWRITER

BACKGROUND

Networks typically include switches, routers, and similar network devices, whose function is to direct network traffic from one part of a network to another. As part of this function, these network devices may modify a network packet. For example, in some cases, a network device for routing or switching may modify a packet header in the course of directing the packet to its destination. For example, the network device may modify a destination or source address, a source or destination port, or a time-to-live field, and any of these changes may require updating a header checksum field. Network devices may include hardware and/or software for modifying a packet.

BRIEF DESCRIPTION OF THE DRAWINGS

Various embodiments in accordance with the present disclosure will be described with reference to the drawings, in which.

DETAILED DESCRIPTION

Figure 1:
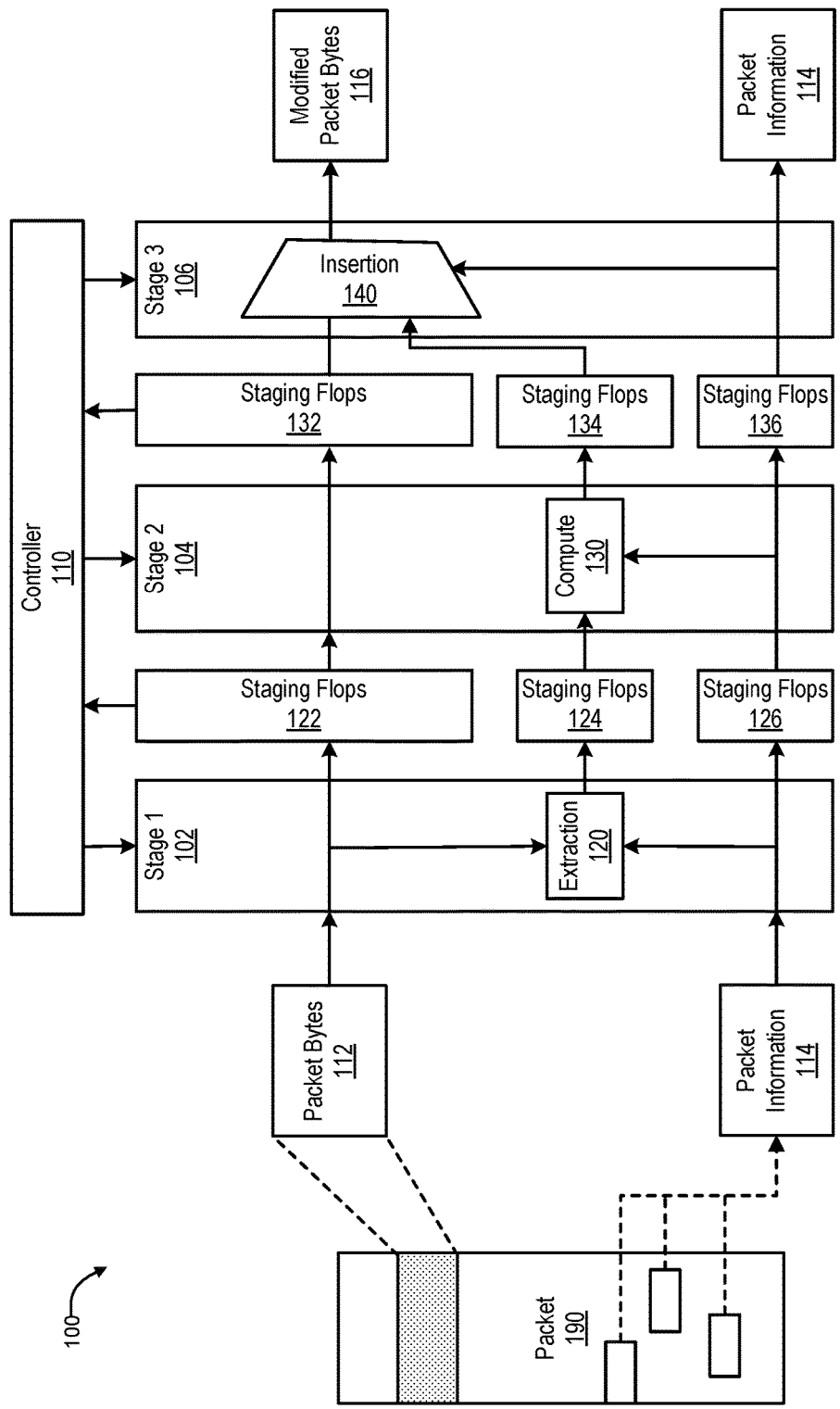
FIG. 1 illustrates an example of a pipeline that may be implemented by a packet rewriter.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Networks typically include switches, routers, and similar network devices, whose function is to direct network traffic from one part of a network to another. As part of this function, these network devices may modify a network packet. For example, packets typically include a header and payload. A packet header typically includes addressing information and other data that can be used by network devices to get the packet to its destination. Packet payload typically includes some information (e.g., an email message, a frame of video, etc.) that is being transported by the packet. In some cases, a network device for routing or switching may modify a packet header in the course of directing the packet to its destination. For example, the network device may modify a destination or source address, a source or destination port, or a time-to-live field.

Network devices may include hardware and/or software for modifying a packet. Herein, a module for modifying a packet in a switch or router or similar network device shall be referred to as a packet rewriter. Network devices for routing and switching receive packets and send packets on their way at the speed of the network (e.g., 10 gigabits per second (Gbps), 100 Gbps or more). Packet rewriters thus typically operate at high clock frequencies in order to have low latency (meaning, they add very little delay) so that they have a minimal effect on the time required by a network device to process a packet.

Several situations arise that may negatively impact a packet rewriter's latency and ability to operate at a high clock frequency. First, in some instances, the packet rewriter may be tasked with modifying one or more bits in a specific field of the packet. This operation typically involves extracting the bits for the field from the packet, modifying the extracted bits, and inserting the modified bits back into the packet.

The packet rewriter may receive a large number of bytes in every clock cycle, particularly when it is in a network device that is operating at high network speeds. When processing large amounts of data in each clock cycle, the extraction, modification, and insertion logic in the packet rewriter may need to be quite complex. Additionally, at high network speeds, a network device may also need to operate at high internal clock frequencies. Higher internal clock frequencies may mean that a packet rewriter may have less time (possibly even not enough time) to do a potentially complex operation.

Second, there may exist dependencies between the fields in a packet header. For example, the value of a first header field may depend on the value of a second header field. This second header field may appear in the packet header before or after the first header field (here "before" and "after" refer to network byte order, or the order in which bytes are transmitted across a network). For example, when the time-to-live field in an Internet Protocol version 4 (IPv4) header is updated, the header checksum (which comes after the time-to-live field) also needs to be updated; thus, the value of the header checksum is dependent on the time-to-live field. In some cases, the value of a header field may depend on more than one other field in the header. For example, the checksum field in an IPv4 header depends on the value of all the other fields in the header (except the options field), including the source and destination IP addresses, which come after the checksum field in the header.

A packet rewriter may be tasked with updating the fields in a packet, including calculating new field values based on the values in other fields. The packet rewriter thus may need to be designed to account for the dependencies between the fields in a packet.

In various implementations, a packet rewriter may be designed to accommodate potentially complex bit field modifications and any dependencies that these modifications have. In some implementations, a packet rewriter may include a pipeline with multiple stages. For modifying a field in the packet, the packet rewriter may extract the field from the packet in a first pipeline stage, modify the field in a second pipeline stage, and may insert the modified field back into the packet in a third pipeline stage. By placing the extraction, modification, and insertion steps into separate pipeline stages, the complexity of each of these steps may be divided into the multiple pipeline stages. Each stage, thus having a simpler operation to execute, may be better able to perform the operation within one clock cycle.

For accommodating field dependencies, in various implementations, a packet rewriter may include a pipeline where each stage of the pipeline is presented with all or most of the data it needs by the immediately preceding pipeline stage. To provide each pipeline stage the data it needs, the packet rewriter may receive packet information, along with a packet. The packet information, which may also be called metadata, may include fields extracted from the packet. Some or all of the packet information may be carried across each pipeline stage, so that each pipeline stage receives any packet information it needs as an input from the immediately preceding stage. The pipeline stages may further be arranged to take into account calculations that depend on values from the packet and/or values that also need to be calculated. For example, when a pipeline stage is to calculate a value using a field from the packet, the field may be extracted in a preceding pipeline stage, and be passed (possibly across other pipeline stages) to the pipeline stage where it is needed. As another example, when a pipeline stage is to calculate a value using values that themselves need to be calculated, the needed value may be calculated in a preceding pipeline stage, and be passed to the pipeline stage where it is needed.

Providing a pipeline stage the values it needs for its own operations may simplify the design of an individual stage. Simplifying each pipeline stage in a packet rewriter may enable the packet rewriter to operate at higher clock frequencies. The packet rewriter may further be better able to scale to higher network speeds.

FIG. 1 illustrates an example of a pipeline 100 that may be implemented by a packet rewriter. A pipeline is a logic structure often used in integrated circuit design to divide complex operations into smaller operations. Each smaller operation is executed in a single pipeline stage, and the operation of each pipeline stage completes within one clock cycle. Outputs from each pipeline stage may be provided as inputs to the next pipeline stage. In this way, a pipeline may enable a logic module to execute a complex operation that would otherwise be difficult to complete within one clock cycle. In a packet rewriter, each pipeline stage may be executing different operations on the same packet, or may be operating on different packets.

The example of FIG. 1 illustrates a pipeline 100 for modifying a field in a packet. The example pipeline 100 includes three stages 102, 104, 106. The pipeline 100 may also have a controller 110 that directs or controls the pipeline stages 102, 104, 106. In some implementations, pipeline 100 may be implemented as an integrated circuit. In some implementations, the pipeline 100 may be implemented in an Application Specific Integrated Circuit (ASIC) or in a Field Programmable Gate Array (FPGA). In some implementations, the pipeline 100 may be included in a System on a Chip (SoC).

The first pipeline stage 102 may receive packet bytes 112 and packet information 114. The packet bytes 112 are some or all of the bytes in a packet 190. The packet bytes 112 may include all of the bytes in a packet 190, and bytes for different packets may arrive in consecutive clock cycles. Alternatively, the packet bytes 112 may include only some of the bytes in a packet 190, and additional bytes for the packet may arrive in consecutive clock cycles. The packet information 114 may include fields extracted from the same packet 190 whose bytes 112 are supplied to the first pipeline stage. For example, the packet information 114 may include fields extracted from the packet's 190 header, such as a source IP address and a destination IP address. In some cases, the packet information 114 overlaps with the packet bytes 112, meaning that the fields in the packet information 114 can be found in the packet bytes. In other cases, the data provided in the packet information 114 is different than the data provided in the packet bytes 112. In some implementations, the packet information 114 may also include other data, in addition to data extracted from the packet 190. For example, in some implementations, the packet information 114 may include values determined by other logic in the same device, or in another device. The packet information 114 may also be referred to as metadata.

The first pipeline stage 102 may include extraction logic 120. The extraction logic 120 may extract a value from the packet bytes 112. For example, the packet bytes 112 may include part of the packet's 190 header, and the extraction logic 120 may be configured to extract the time-to-live field from the header. The extraction logic 120 may be directed by information provided by the packet information 114, such as for example a bit indicating that the time-to-live field needs to be updated.

The extraction logic 120 may be generic, meaning that it does not need to know what is in the packet bytes 112, and only needs to know which bits to extract. In various implementations, the number of bytes in the packet bytes 112 may be different. This may occur when a packet rewriter receives data at different network speeds (which may also be referred to as line rates). For example, a 100 Gbps network may require that a network device process ten times more data per second that a 10 Gbps network. Furthermore, the same network device may be placed in different networks, running at different network speeds, and/or one network may operate at different speeds under different conditions.

Because the extraction logic 120 is generic, however, the pipeline 100 can accommodate packet bytes 112 of different sizes. For example, for an IPv4 packet, at one network speed the packet bytes 112 may include 64 bits from the packet 190. To extract the time-to-live field, the extraction logic 120 can be told to extract eight bits, starting at bit zero. At a different network speed, the packet bytes 112 may include 128 bits from the packet 190. In this case, the extraction logic 120 can be told to extract eight bits starting at bit 64 to extract the time-to-live field. In both cases, the extraction logic 120 only needs an offset and bit width. Furthermore, in the next clock cycle, the same extraction logic 120 can be used to extract a different value from different packet bytes.

Between the first pipeline stage 102 and the second pipeline stage 104, the pipeline 100 may include staging flops 122, 124, 126. The staging flops 122, 124, 126 pass and hold data between clock cycles. In some cases, the logic within a pipeline stage is generally combinational logic. Combinational logic generally does not including memory elements, meaning that combinational logic produces an output for a given input, and when the input changes, so does the output. In a pipeline, flops (which is short for flip-flops) provide memory elements: at each transition of a clock, a flop captures the value at its input, and provides the same value at its output. The flop will continue to provide the same value until the next clock transition.

In some cases, a pipeline stage may include memory elements, such as a state machine. In these cases, memory elements may update when new values are input to the stage. In some implementations, the previous state of the memory elements may be captured by flops, to be provided to the next stage of the pipeline.

In the illustrated example, the pipeline 100 includes staging flops 122 for the packet bytes, staging flops 126 for the packet information, and staging flops 124 for the value extracted in the first pipeline stage 102. In this example, packet bytes 112 are not modified in the first pipeline stage 102, and are captured by the staging flops 122 to be provided to the next pipeline stage. The packet information 114 is also not modified, though in some cases some of the packet information 114 is captured by the staging flops 126. For example, in some cases, later stages of the pipeline 100 may not need some of the packet information 114. In these cases, the unneeded data is not captured by the staging flops 126, and the amount of data carried forward is reduced.

The second pipeline stage 104 of this example includes computation logic 130. The computation logic 130 may receive as an input the value extracted in the first pipeline stage 102, and may produce a computed value. In some cases, the computation logic 130 may also use one or more values from the packet information 114 to produce the computed value. In some cases, the computation logic 130 may be spread across multiple pipeline stages, such as for example when the computation being executing is particularly complex.

Between the second pipeline stage 104 and the third pipeline stage 106, the pipeline 100 of this example includes another set of staging flops 132, 134, 136. One set of staging flops 132 captures and provides the packet bytes 112 to the next stage. In this example, the packet bytes 112 are not modified in the second pipeline stage 104, and pass through to the next stage. Another set of staging flops 136 captures the packet information 114, which here is also not modified in the second pipeline stage 104. In some cases, as discussed above, not all the packet information 114 is carried forward to the third pipeline stage 106. Another set of staging flops 134 captures and carries forward the value computed by the computation logic 130.

The third pipeline stage 106 of this example includes insertion logic 140. The insertion logic 140 may insert the value computed in the second pipeline stage 104 into the packet bytes 112. In some cases, the insertion logic 140 may be directed by the packet information 114. For example, the packet information 114 may enable or disable the insertion operation. As with the extraction logic 120, the insertion logic 140 may be generic, meaning that it does not need to know any of the specific values or fields that may be in the packet bytes 112. Furthermore, the insertion logic 140 can be configured to insert bytes for one field in one clock cycle, and bytes for an unrelated field (possibly in a different packet) in the next clock cycle.

The third pipeline stage 106 provides the now modified packet bytes 116 to some other logic in the network device. This other logic may be additional pipeline 100 stages, or may be logic that makes use of the output of the packet rewriter, such as logic for transmitting the packet.

In various implementations, the pipeline 100 illustrated in FIG. 1 may have additional pipeline stages. For example, in these implementations, the pipeline 100 may include additional stages between the first pipeline stage 102 and the second pipeline stage 104. In these implementations, the packet bytes 112, the packet information 114, and the value extracted in the first pipeline stage 102 may be carried across each additional stage to the second pipeline stage 104. As another example, in some implementations, the pipeline 100 may include additional stages between the second pipeline stage 104 and the third pipeline stage 106. In these implementations, the packet bytes 112, the packet information 114, and the value computed in the second pipeline stage 104 may be carried across the additional stages to the third pipeline stage 106.

In various implementations, the operations in the three example pipeline stages 102, 104, 106 can be combined into one stage. For example, in some cases, it may be efficient to combine the extraction logic 120 with the computation logic 130 in one stage. As another example, in some cases, it may be efficient to combine the computation logic 130 and the insertion logic 140 in one stage. The illustrated example, however, provides a potentially more flexible implementation. For example, the extraction and insertion logic can be generic and not depend on the particular data being extracted or inserted. Additionally, the amount of data in the packet bytes 112, the alignment of the fields in the packet bytes 112, and the specific location of a field within the packet bytes 112 can be accommodated by providing an appropriate offset and field length to the extraction logic 120 and insertion logic 140. Furthermore, the amount of logic in each of the pipeline stages 102, 104, 106 can be minimized, so that the pipeline 100 can be run at higher clock rates.

In various implementations, the example pipeline 100 may include a controller 110. The controller 110 may provide flow control for the pipeline 100, meaning that the controller 110 may attempt to maintain a constant flow of data through the pipeline 100 and/or may attempt to prevent data being lost because it cannot be accepted. For example, the controller 110 may monitor whether logic that receives data from the pipeline 100 is unable to accept more data. In this example, the controller 110 may signal to the pipeline stages to stop advancing data, meaning that the output of the first pipeline stage 102 is not advanced to the second pipeline stage 104, and/or the output of the second pipeline stage 104 is not advanced to the third pipeline stage 106. As another example, the controller 110 may also monitor whether "bubbles" or empty cycles have entered the pipeline 100. A bubble occurs when the pipeline 100 receives bytes for a packet in one clock cycle, then may experience one or more clock cycles when no bytes are received, and then receives more bytes, possibly for the same packet. A bubble may occur, for example, when bytes have been removed from a packet. In some cases, bubbles may need to be removed so that all the parts of a packet are received consecutively by the logic that is receiving data from the pipeline 100. When the pipeline 100 has bubbles in it, the controller 110 may determine to stall one or more stages in the pipeline 100 to remove the bubbles. For example, the controller may stall the third pipeline stage 106 for one clock cycle to remove a bubble from the second pipeline stage 104, and/or may stall the second pipeline 104 to remove a bubble from the first pipeline stage 102.

Figure 2:
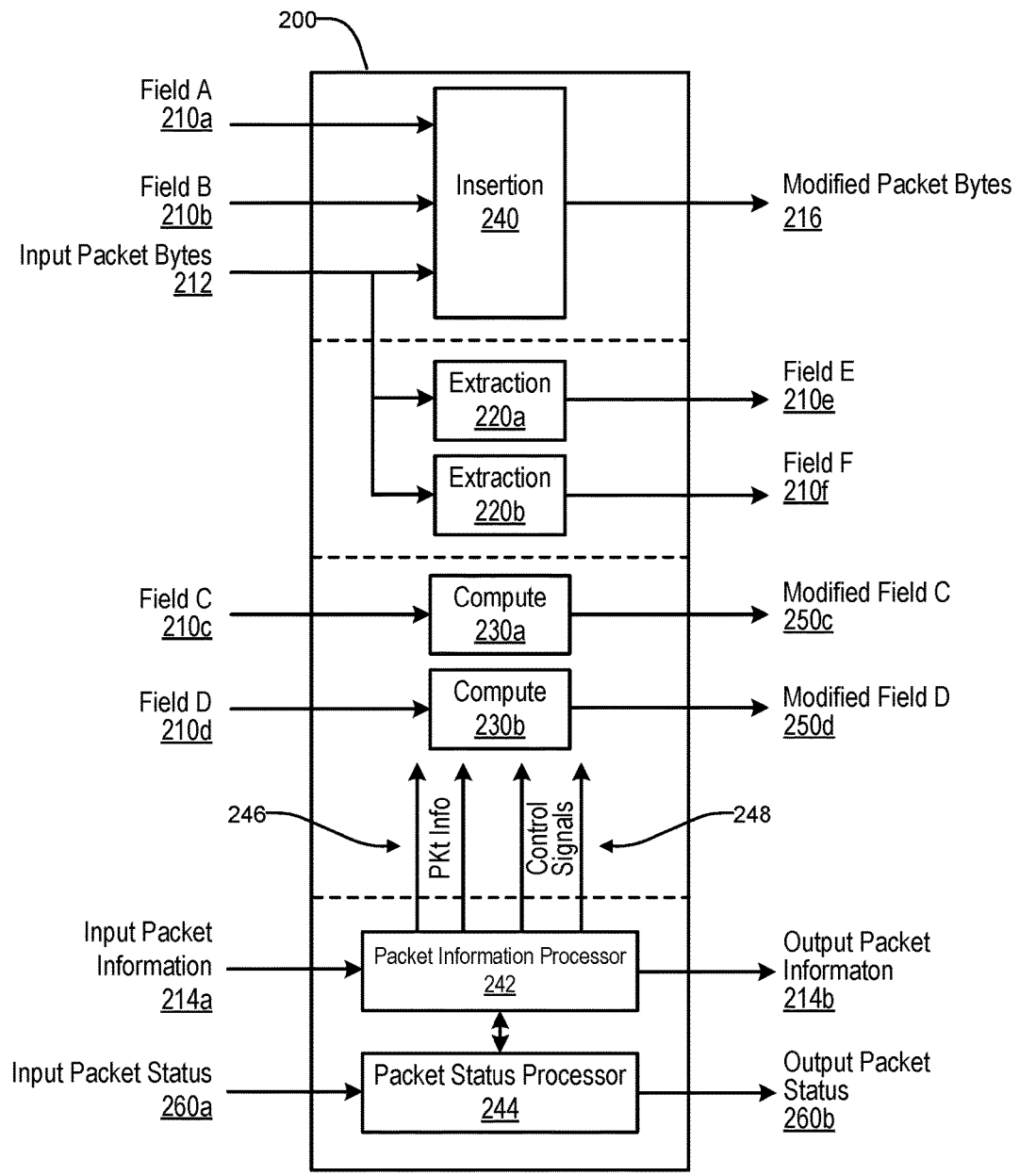
FIG. 2 illustrates an example of a pipeline stage that can extract some fields from packet bytes, insert other fields into the same packet bytes, and execute computations to update yet other fields.

FIG. 1 illustrates that three operations for modifying a field in a packet—extraction of the field, computation of an updated value, and insertion of the updated value back into the packet bytes—can each be executed by a different pipeline stage. In various implementations, one pipeline stage can also execute all three operations for multiple different fields. FIG. 2 illustrates an example of a pipeline stage 200 that can extract some fields from packet bytes, insert other fields into the same packet bytes, and execute computations to update yet other fields. In some implementations, pipeline stage 200 may be implemented as an integrated circuit, and/or be incorporate into an ASIC or FPGA.

The example pipeline stage 200 may receive as inputs one or more fields 210a-d, input packet bytes 212 from a packet, and input packet information 214a for the packet. In some implementations, the pipeline stage 200 may also receive input packet status 260a information. The pipeline stage 200 may include insertion logic 240, extraction logic 220a-b, and computation logic 230a-b for processing the received inputs. In some implementations, the pipeline stage 200 may also have packet information processor logic 242 and/or packet status processor logic 244.

In various implementations, the pipeline stage 200 may have additional logic, not illustrated here, for other operations. In various implementations, the pipeline stage 200 may have fewer logic blocks than are illustrated here. The pipeline stage 200 may output modified packet bytes 216, output packet information 214b, one or more extracted fields 210e-f, and/or one or more modified fields 250c-d. In some implementations, the pipeline stage 200 may also output an output packet status 260b.

In various implementations, the example pipeline stage 200 can be used for one or more stages in the same pipeline logic. For example, in the example pipeline 100 of FIG. 1, one or more of the pipeline stages 102, 104, 106 may be implemented using the example pipeline stage 200 of FIG. 2.

In the example pipeline stage 200, the insertion logic 240 inserts fields into input packet bytes 212. In the illustrated example, the pipeline stage 200 receives two fields, Field A 210a and Field B 210b, as well as input packet bytes 212. Field A 210a, Field B 210b, and the input packet bytes 212 may be received from a prior pipeline stage, or may be received from other logic. In some implementations, the fields 210a-b may be specific; for example, for a specific instance of the pipeline stage 200, the fields may always be a time-to-live field and a source IP address. Alternatively or additionally, in some implementations, the fields 210a-b may be generic 8-bit, 16-bit, 32-bit, or some other size input, and the pipeline stage 200 may not have hardwired knowledge of the contents of the fields 210a-b. In these implementations, the insertion logic 240 may be a generic, content-independent configuration of shifters and masking logic. In these implementations, the contents of the fields 210a-b may be different in different clock cycles.

The insertion logic 240 may be configured to insert Fields A 210a and B 210b into the input packet bytes 212, and produce modified packet bytes 216. The insertion logic 240 may receive an offset and length for each of the two fields 210a, 210b. The offset describes where in the input packet bytes 212 a field is to be inserted, and the length describes how many bytes to insert. For example, the insertion logic 240 may receive an offset of 32 and a length of 8 for Field A 210a, indicating that Field A 210a should be inserted at bit 32 of the input packet bytes 212, and that a total of 8 bits are to be inserted, starting at bit 32. The offset and length can also be specified in bytes, or some other unit size. Insertion of the fields 210a-b generally overwrites a related value in the input packet bytes 212. For example, when Field A 210a is a time-to-live field, inserting Field A 210a into the input packet bytes 212 may overwrite a time-to-live value in the input packet bytes 212. Presumably, the time-to-live value in the input packet bytes 212 is less current than the value in Field A 210a.

In some implementations, the insertion logic 240 may be configured to insert only Field A 210a, only Field B 210b, or neither field 210a-b. Which fields to insert into the packet bytes 212 may be controlled by control signals 248 from the packet information processor 242, or from external control logic. In some implementations, the insertion logic 240 may receive more fields or fewer fields. In some implementations, the pipeline stage 200 may receive no fields for insertion. In these implementations, the pipeline stage 200 may omit the insertion logic 240. The extraction logic 220a-b extracts fields from the input packet bytes 212. In this example pipeline stage 200, the extraction logic 220a-b receives the same input packet bytes 212 as are received by the insertion logic 240. In this example, the extraction logic 220a-b is configured to extract two fields, Field E 210e and Field F 210f from the input packet bytes 212. The extraction logic 220a-b may receive an offset and length for each of the two fields 210e-f. The offset describes where in the input packet bytes 212 a field can be found, and the length describes how many bits to extract. For example, the extraction logic 220a may receive an offset of 16 and a length of 32, indicating that Field E 210e can be found at bit 16 of the input packet bytes 212, and that 32 bits should be extracted, starting at bit position 16. The offset and length can also be specified in bytes, or some other unit size.

Generally, the information extracted in Fields E 210e and F 210f is different from the information inserted from Fields A 210a and B 210b. Should the pipeline stage 200 need to output Fields A 210a and B 210b, these fields may be carried across the pipeline stage 200, and not be inserted into the packet bytes 212. In most cases, the value of Fields A 210a and B 210b may be different—probably more current—than their equivalent values in the input packet bytes 212. Thus, in most cases, the extraction logic 220a-b may be extracting values for different fields 210e-f. In some cases, however, the extraction logic 220a-b may be extracting values that are being overwritten by the insertion logic 240, for example to retrieve the pre-insertion values.

In some implementations, the extraction logic 220a-b may be configured to extract only Field E 210e, only Field F 210f, or neither fields 210e-f. Which fields to extract from the input packet bytes 212 may be controlled by control signals 248 from the packet information processor 242, or from external control logic. In some implementations, the extraction logic 220a-b may extract more fields or fewer fields. In some implementations, the pipeline stage 200 may extract no fields. In these implementations, the pipeline stage 200 may omit the extraction logic 220a-b.

The computation logic 230a-b may compute a new value for one or more fields. In this example pipeline stage 200, the computation logic 230a-b computes new values for two fields, Field C 210c and Field D 210d. Fields C 210c and D 210d may be received from a prior pipeline stage, or from other logic. In some implementations, the fields 210c-d may be specific; for example, for a specific instance of the pipeline stage 200, they may always be flags and a checksum. Alternatively or additionally, in some implementations, the fields 210c-d may be generic inputs of some size, and the pipeline stage 200 may have no hardwired knowledge of the contents of the fields 210c-d. In various implementations, the computation logic 230a-b may be a generic arithmetic logic unit or other logic for adding, subtracting, and/or performing bitwise, logical operations (e.g. logical AND, logical OR, logical XOR, etc.).

The computation logic 230a-b may be configured to calculate new values for Fields C 210c and D 210d, and produce updated or modified Field C 250c and Field D 250d. The computation logic 230a-b may operate on each input field 210c-d independently, such as for example by executing an increment or decrement operation. Alternatively, the computation logic 230a-b may combine the input fields 210c-d with each other and/or with packet information 246. The operation executed by the computation logic 230a-b may be controlled by control signals 248 from the packet information processor 242, or from external control logic. Operations that may be executed by the computation logic 230a-b include, for example, arithmetic operations, logical operations, and comparison operations, among others. The computation logic 230a-b may execute a combination of operations.

Generally, Fields C 210c and D 210d are different from Fields A 210a and B 210b. Generally, in many cases, Fields A 210a and B 210b were modified in an earlier pipeline stage. Also, in many cases, Fields C 210c and D 210d may be inserted into the modified packet bytes 216 in a later pipeline stage.

In some implementations, the computation logic 230a-b may be configured to compute only modified Field C 250c, only modified Field D 250d, or neither field 250c-d. Which fields to compute may be controlled by control signals 248 from the packet information processor 242 or from external control logic. In some implementations, the computation logic 230a-b may operate on more or fewer fields. In some implementations, the pipeline stage 200 may receive no fields for computation. In these implementations, the pipeline stage may omit the computation logic 230a-b.

In some implementations, the pipeline stage 200 may include a packet information processor 242 and/or packet status processor 244. In these implementations, the packet information processor 242 may provide specific packet information 246 from the input packet information 214a to the logic in the pipeline stage 200. For example, the packet information processor 242, when the computation logic 230a is computing a next checksum value, the packet information processor 242 may provide a destination address to add to the computation.

The packet information processor 242 may be directed by the packet status processor 244. In some implementations, the packet status processor 244 may direct the control signals 248 sent to other logic in the pipeline stage 200. The packet status processor 244 may receive an input packet status 260a. The input packet status 260a may indicate a current status for the packet. For example, in the example pipeline 100 illustrated in FIG. 1, for a Field G, the input packet status may tell the first pipeline stage 102 to extract Field G from the packet bytes 112. The first pipeline stage 102 may indicate to the second pipeline stage 104 that Field G has been extracted. The second pipeline stage 104 may use this status to compute a new value for Field G. The second pipeline stage may inform the third pipeline stage 106 that it has computed a new value for Field G. The third pipeline stage may use this information to insert the new Field G into the packet bytes 112. For a different field the packet status may mean something different in each stage. For example, for a Field H, the same packet status may tell the second pipeline stage 104 to extract Field H and tell the third pipeline stage to compute a new value for Field H.

The packet information processor 242 of FIG. 2 may produce output packet information 214b. In most cases, the output packet information 214b includes some or all of the same information as the input packet information 214a. In some cases, the packet information processor 242 may determine that some information does not need to be passed to later pipeline stages, because the information is not needed by those pipeline stages. In these cases, the output packet information may omit this unneeded information.

The packet status processor 244 may output an output packet status 260b. The output packet status 260b may inform a subsequent pipeline stage or other logic of the status of the packet after the fields 210a-d and input packet bytes 212 have been operated on by the pipeline stage 200. This information may be used by the subsequent pipeline stage to determine how it should operate on the data it receives from the current pipeline stage.

The examples of FIGS. 1 and 2 illustrate how a field located anywhere in a packet can be modified using three stages of a pipeline. Using the illustrated examples, a pipeline can be designed that is able to handle the field being located anywhere in the input bytes. The individual pipeline stages may also be less complex, and thus better able to run at higher clock speeds.

As noted above, modifying a field in the packet is one situation that may impact a packet rewriter's ability to operate quickly and at high clock frequencies. Another situation is dependencies between the fields in a packet. In various implementations, the examples illustrated in FIGS. 1 and 2 can be used to manage inter-field dependencies, to produce a packet rewriter that has low latency and that can operate at high clock speeds.

Figure 3A:
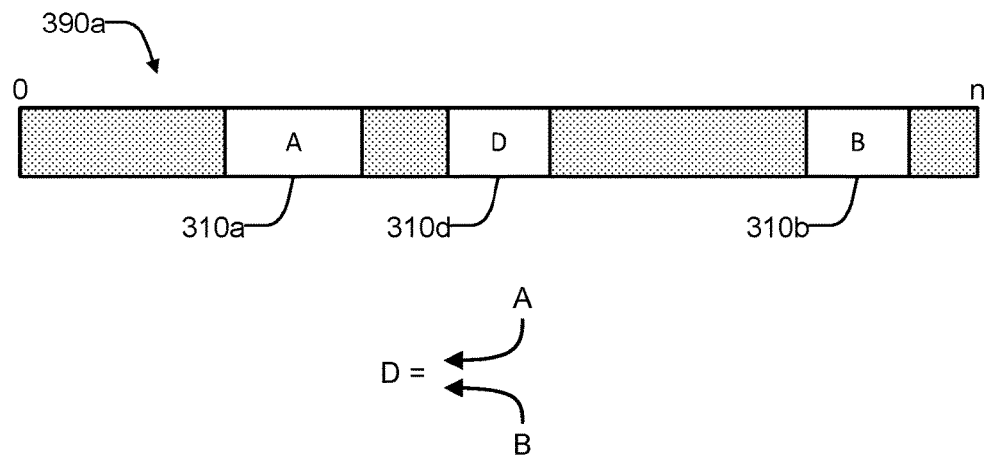
FIG. 3A illustrates an example of dependencies that may occur between fields in a packet.

FIG. 3A illustrates an example of dependencies that may occur between fields in a packet 390a. FIG. 3A illustrates an example of a packet 390a that may be received by a packet rewriter. The packet 390a may be received all at once, or may be received in pieces. In this example, "earlier" bytes—that is, bytes received from the network first—are on the left, and "later" bytes—bytes received from the network last—are on the right. In this example, the packet rewriter has been directed to modify Field D 310d in this packet 390a. In this example, the new value of Field D 310d depends on the values of Field A 310a and Field B 310b. Field A 310a occurs earlier in the packet 390a, meaning that it could be received by the packet rewriter before the packet rewriter receives Field D 310d. The packet rewriter may also receive some number of bytes between receiving Fields A 310a and D 310d. Field B 310b, in turn, occurs later in the packet 390a, meaning that it could be received by the packet rewriter after the packet rewriter receives Field D 310d. The packet rewriter may also receive some number of bytes after Field D 310d before receiving Field B 310b.

Figure 3B:
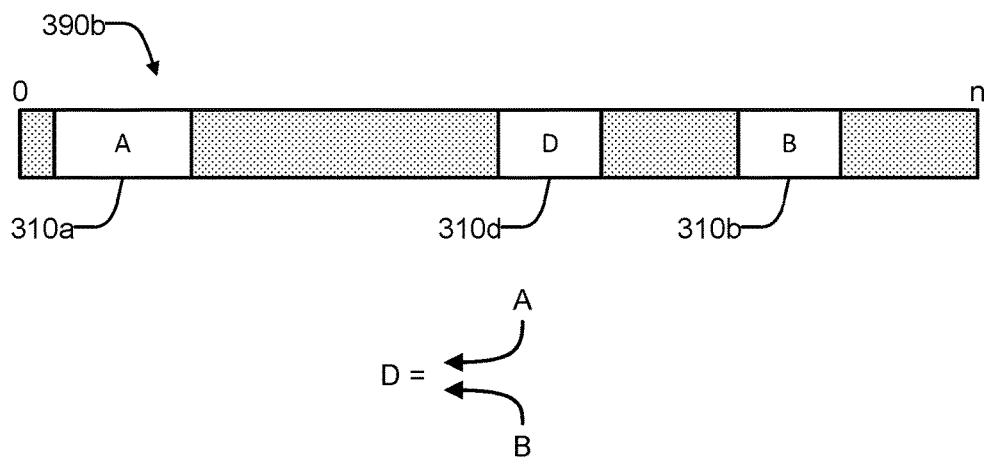
FIG. 3B illustrates another example of a packet that may be received by the same packet rewriter that receives the packet illustrated in FIG. 3A.

The number of bytes that occur between the Fields A 310a and D 310d, and between Fields D 310d and B 310b may vary from one packet to another. FIG. 3B illustrates another example of a packet 390b that may be received by the same packet rewriter that receives the packet 390a illustrated in FIG. 3A. In FIG. 3B, the order that the fields 310a, 310b, 310d occur in the packet 390b is the same, but the number of bytes between the fields 310a, 310b, 310d is different. In this example, the number of bytes between Fields A 310a and D 310d is greater, while the number of bytes between Fields D 310d and B 310b is fewer. For other packets, the number of bytes between the fields 310a, 310b, 310d can also be different.

Figure 4A:
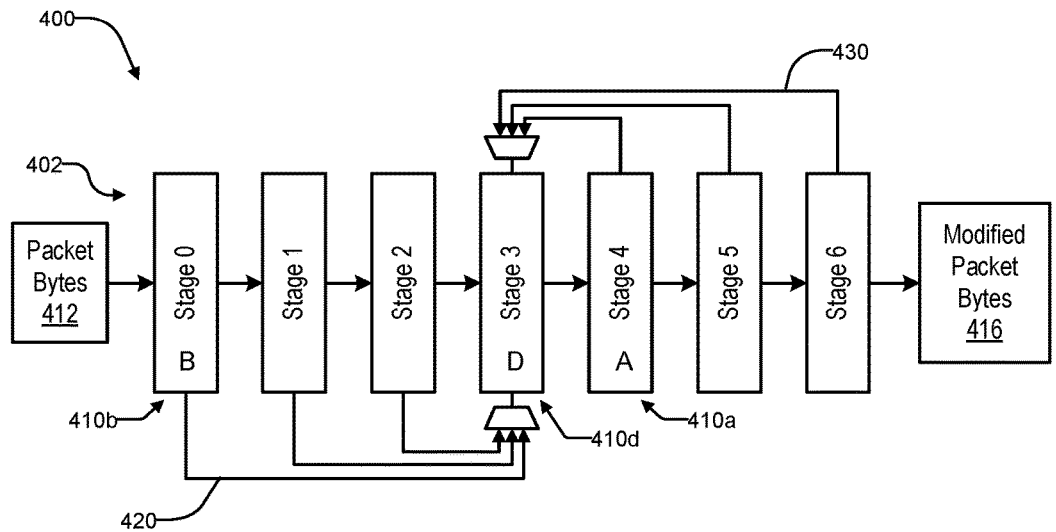
FIGS. 4A-4B illustrate an example of a pipeline implementation that can modify a field that depends on the value of two other Fields A and B.
Figure 4B:
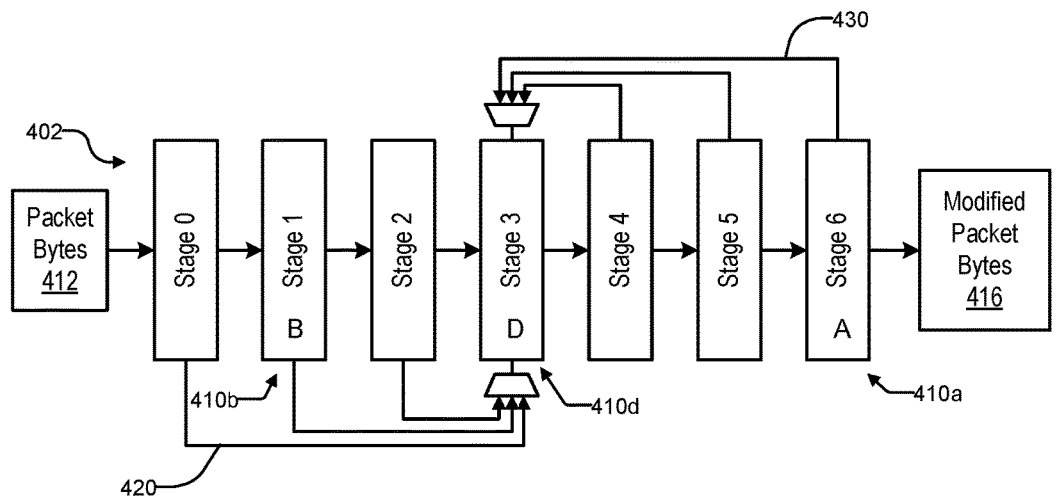

FIGS. 4A-4B illustrate an example of a pipeline 400 implementation that can modify a field that depends on the value of two other Fields A 410a and B 410b. The illustrated pipeline 400 includes seven pipeline stages 402. Seven pipeline stages 402 may be the appropriate number for the operations, including modifying Field D 410*d*, that the pipeline 400 is meant for. At a given clock cycle, the pipeline 400 may receive packet bytes 412 from a packet. After seven clock cycles, the pipeline 400 may output modified packet bytes 416, where the modified packet bytes 416 are the received packet bytes 412 with the modified version of Field D 410*d* inserted.

FIG. 4A illustrates how the pipeline 400 may handle the packet 390*a* illustrated in FIG. 3A. In FIG. 4A, Field D 410*d* is modified in pipeline stage 3. Stage 3 may be the appropriate stage for modifying Field D 410*d* for a variety of reasons, such as stage 3 being the last stage in which this modification can be done, or it is the earliest stage in which this modification can be done, or this stage has physical space for the computation, or because stage 3 is as good a stage as any, or for other reasons, as discussed below. The packet bytes 412 may be clocked across each stage to stage 3. In some cases, Field D 410*d* may be extracted from the packet bytes 412 in stage 3, may be updated in the same stage, and may be inserted back into the packet bytes 412 in the same stage. The packet bytes 412 may then be clocked across the remaining stages until it is output at stage 6.

In this example, the new value of Field D 410*d* depends on the values of Fields A 410*a* and B 410*b*. Field A 410*a* occurs earlier in the packet, and so will be in a later stage of the pipeline 400. In this example, Field A 410*a* is in stage 4 when Field D 410*d* is in stage 3. To make Field A 410*a* available for computing a new value for Field D 410*d*, the pipeline 400 may include feedback paths 430. A feedback path 430 from stage 4 may provide Field A 410*a* to stage 3.

Meanwhile, Field B 410*b* occurs later in the packet, so will be in an earlier stage of the pipeline 400. In this example, Field B 410*b* is in stage 0 when Field D 410*d* is in stage 3. This illustrates at least one reason why a new value for Field D 410*d* may be computed in stage 3: four stages (stages 0, 1, 2, and 3) are required before Field B 410*b* is in the pipeline, and therefore available for computing a new value for Field D 410*d*. To provide Field B 410*b* to stage 3, the pipeline 400 may include forwarding paths 420, including a forwarding path from Field B 410*b* from stage 0 to stage 3.

FIG. 4B illustrates how the pipeline 400 may handle the packet 390*b* illustrated in FIG. 3B. In FIG. 4B, the example pipeline 400 is the same pipeline illustrated in FIG. 4A. In FIG. 4B, Field D 410*d* is thus also modified in stage 3, since that is where the modification logic resides. In this example, there are fewer bytes between Fields D 410*d* and B 410*b*, and so when Field D 410*d* reaches stage 3, Field B 410*b* is in stage 1. To provide Field B 410*b* to the computation in stage 3, the pipeline includes an additional forwarding path 420 to forward Field B 410*b* from stage 1 to stage 3. For another packet, Field B 410*b* may be in stage 2 when Field D 410*d* is in stage 4; thus, the pipeline also includes a forwarding path 420 for Field B 410*b* from stage 2 to stage 3.

In this example, there are also more bytes between Fields D 410*d* and A 410*a*. Thus, when Field D 410*d* is in stage 3, Field A 410*a* is in stage 6. This illustrates one reason for the need for seven stages in this example: with fewer stages, Field A 410*a* would not be available when Field D 410*d* is in stage 3. The intermediate stages may not be needed for anything other than delaying Field A 410*a* from exiting the pipeline 400.

To provide Field A 410*a* to the computation in Field D 410*d*, the pipeline 400 may include a feedback path 430 from stage 6 for Field A 410*a*. For a different packet, Field A 410*a* may be in stage 4 when Field D 410*d* is in stage 3; thus the pipeline 400 also includes a feedback path 430 from stage 5 to stage 3.

As illustrated in FIGS. 4A-4B, dependencies between the fields in a packet may affect the number of stages in a packet rewriter's pipeline 400. The pipeline 400 may need enough stages so that Fields A 410*a* and B 410*b* are both available to modify Field D 410*d*. Feedback and forwarding signals provide one solution for making Fields A 410*a* and B 410*b* available, but for pipelines with many stages, this signals may be very long and may be very difficult to route in the integrated circuit design layout. The length of these signals may also restrict the clock frequency of the pipeline, which has to accommodate the amount of time required for a value to travel across the feedback or forwarding signal. Short feedback and forwarding signals, however, such as between immediately adjacent pipeline stages, or between pipeline stages that are one or two stages apart, may not have timing issues.

The pipeline design of FIGS. 4A-4B may further be difficult to implement when more dependencies are involved. For example, a Field E may also depend on Fields A 410*a* and B 410*b*, and Field E, necessitating either more pipeline stages and/or more feedback or forwarding signals.

Figure 5:
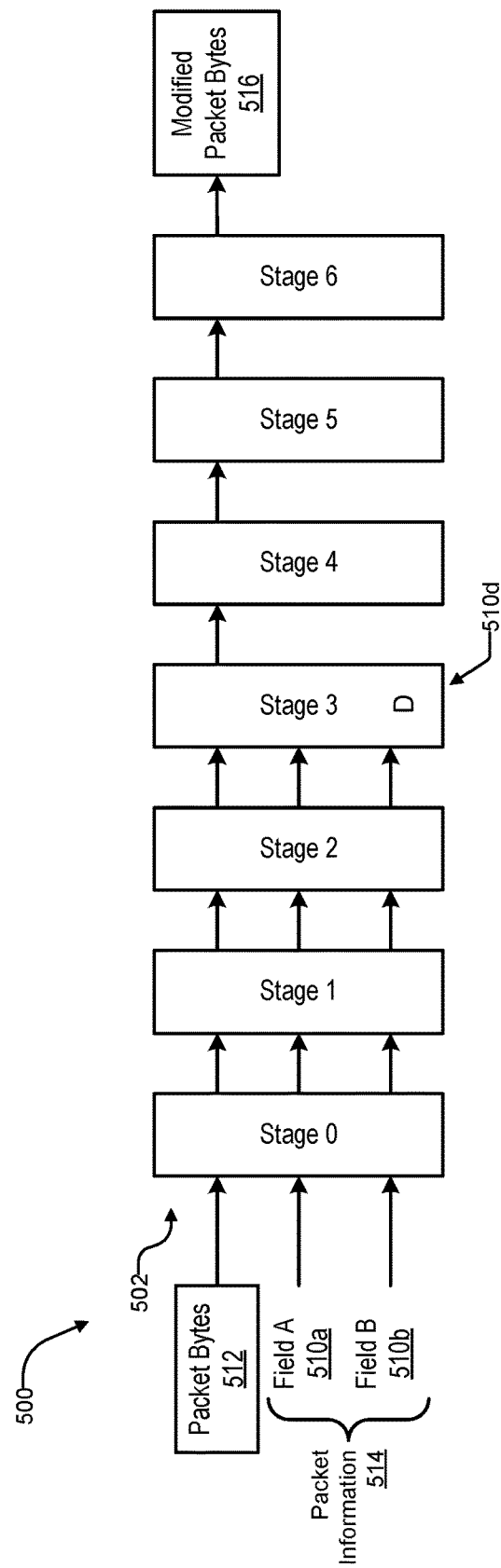
FIG. 5 illustrates an example of an alternate pipeline implementation that can accommodate modifying a field that depends on other fields.

FIG. 5 illustrates an example of an alternate pipeline implementation that can accommodate modifying a field that depends on other fields. The example pipeline 500 illustrated in FIG. 5 includes seven pipeline stages 502. These seven stages may be, for example, the same seven stages used by the pipeline 400 illustrated in FIGS. 4A-4B. The pipeline stages 502 of FIG. 5 may also execute same operations as the stages in the pipeline 400, including calculating a new value for Field D 510*d* in stage 3. The pipeline 500 may receive packet bytes 512 for a packet, and after seven clock cycles produce modified packet bytes 516. The modified packet bytes 516 may include updated value for Field D.

The example pipeline 500 also receives Fields A 510*a* and B 510*b* as inputs to Stage 0. Fields A 510*a* and B 510*b* may be included in packet information 514. The packet information 514 may include various fields and values extracted from the packet by other logic in the network device, and/or other information about the packet. Fields A 510*a* and B 510*b* may be field extracted from the packet, or may be information about the packet determined by other logic in the packet, or may be values calculated from fields from the packet. The packet bytes 512 are some or all of the bytes from the same packet.

In the example pipeline 500, the packet bytes 512, Field A 510*a*, and Field B 510*b* are clocked across stages 0, 1, and 2 to stage 3. Stage 3 may be the appropriate stage for computing the new value of Field D 510*d* for a variety of reasons, such as stage 3 being the earliest point in the pipeline 500 where the value can be computed. Dependencies on other stages, however, would not be a reason, because stage 3 receives as inputs from the adjacent preceding stage all the values it needs to execute its operations, including Fields A 510*a* and B 510*b*. Thus to compute the new value of Field D 510*d*, the pipeline 500 does not need feedback or forwarding paths. Additionally, Fields A 510*a* and B 510*b* may not be needed after stage 3, and thus may not be clocked across the remaining stages, thus reducing the number of signals and flops needed between the stages. The implementation of FIG. 5 thus results in a simpler and possibly less timing-depending design.

In an alternate case, Fields A 510*a* and B 510*b* can also be extracted from the packet bytes 512, when the fields 510*a-b* are within the same packet bytes 512 as Field D 510*d*. In such cases, Fields A 510*a* and B 510*b* can be extracted from the packet bytes 512 in any of stages 0, 1, or 2, whichever is the most convenient. In the illustrated example, Fields A 510*a* and B 510*b* may be provided in the packet information 514 when they are not available in the same packet bytes 512 as Field D 510*d*.

Figure 6:
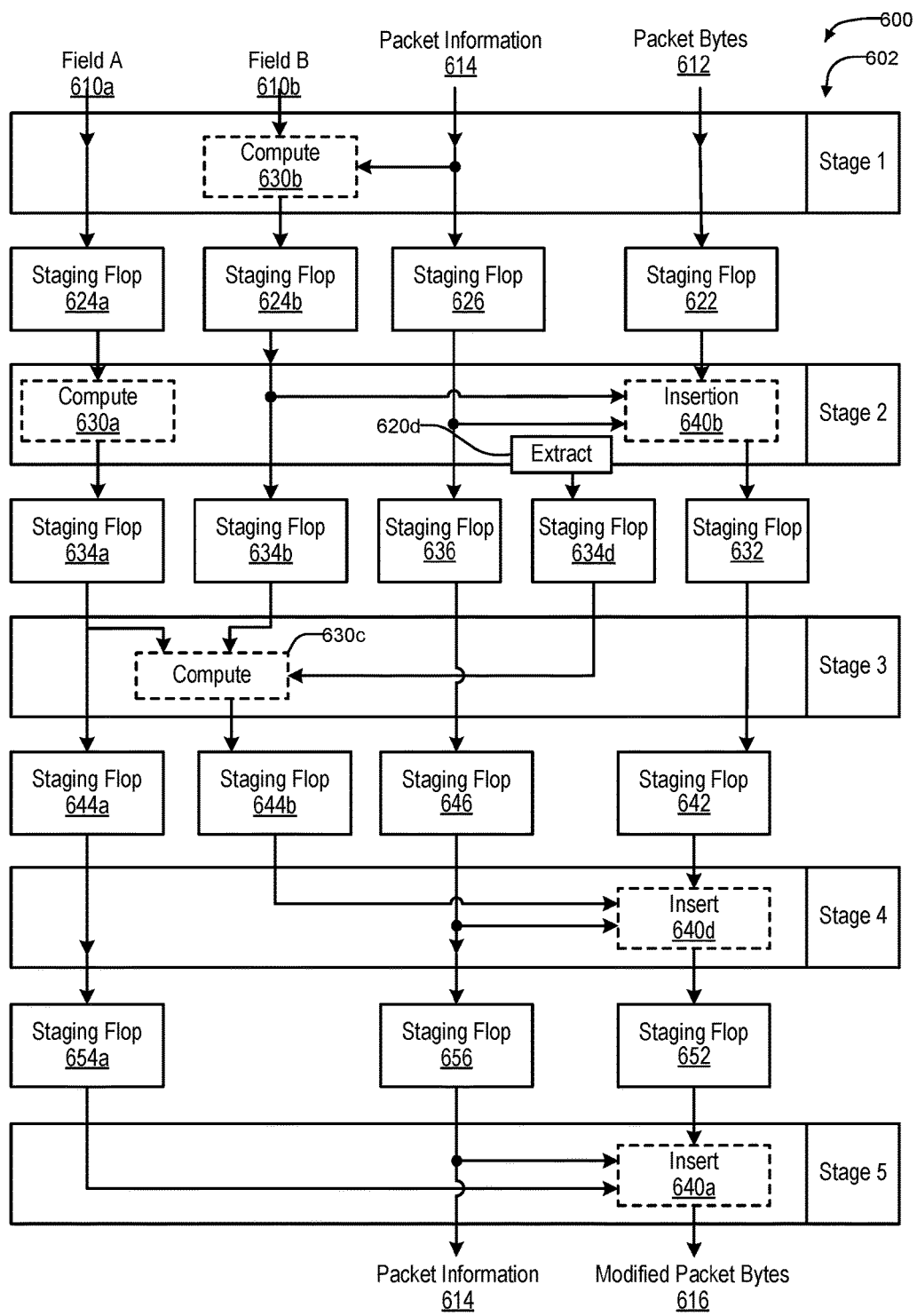
FIG. 6 illustrates an example implementation of the pipeline of FIG. 5 in an example scenario where a Field D depends on the values of two Fields A and B, which themselves need to be updated and added to the packet.

FIG. 6 illustrates an example implementation of the pipeline 500 of FIG. 5 in an example scenario where a Field D depends on the values of two Fields A 610*a* and B 610*b*, which themselves need to be updated and added to the packet. The pipeline 600 of FIG. 6 includes five pipeline stages 602. Five pipeline stages 602 are the minimum needed to illustrate this example. The pipeline 600 may otherwise include more stages, which may come after stage 5 and/or may come in between the illustrated five stages. When the pipeline 600 includes additional stages between the illustrated stages, the values from an illustrated preceding stage are carried across the intervening stages to the next illustrated stage.

Stage 1 of the example pipeline 600 receives packet bytes 612 from a packet, as well as packet information 614 for the same packet. Stage 1 also receives Field A 610*a* and Field B 610*a*. Fields A 610*a* and B 610*b* can also be considered packet information 614, and are illustrated here separately for clarity. As noted above, the packet information 614 (possibly including Fields A 610*a* and B 610*b*) may include fields extracted from the packet, including fields that may or may not also be included in the packet bytes 612. In some cases, the packet information 614 alternatively or additionally includes information determined for the packet by other logic in the network device. Alternatively or additionally, fields in the packet information 614 (possibly including Fields A 610*a* and B 610*b*) may have been modified before being given to the pipeline 600.

The example logic in stage 1 includes computation logic 630*b* for computing a new value for Field B 610*b*. In some cases, the new value for Field B 610*b* is computed using values from the packet information 614. In some implementations, stage 1 could be implemented using the pipeline stage 200 of FIG. 2. In these implementations, stage 1 of FIG. 6 may have only the computation logic of the pipeline stage 200 and omit the extraction and insertion logic, or may have the extraction and insertion logic, and leave this logic disabled.

Between stages 1 and 2, the pipeline 600 includes staging flops 622, 624*a-b*, 626. One set of staging flops 622 receives the packet bytes 612 from stage 1, and provides the packet bytes 612 to stage 2. Another set of staging flops 626 receives the packet information 614, and provides the packet information 614 to stage 2. In this example, the packet information 614 has not been modified in stage 1, and is carried forward to be used in other stages. In some cases, only packet information that is needed later in the pipeline is carried forward. Another set of staging flops 624*a* receives and carries forward Field A 610*a*. Another set of staging flops 624*b* receives the new value of Field B 610*b*, and provides this new version of Field B 610*b* to stage 2. In this example, the old value of Field B 610*a* is not needed after stage 1, and thus is not carried forward.

Stage 2 includes computation logic 630*a* for computing a new value for Field A 610*a*. This computation could have been done in stage 1, but it may be more practical in some instances to have this computation in stage 2. For example, having the computation logic 630*a* for Field A 610*a* in stage 2 rather than in stage 1 may reduce the density of the logic in stage 1. Alternatively, stage 1 may have only one computation logic module, which while used for Field B 610*b* perhaps cannot also be used for Field A 610*a*. In other situations, however, it may possible or more practical to have the computation logic 630*a* for Field A 610*a* in stage 1, in addition to or instead of the computation logic 630*b* for Field B 610*b*.

Stage 2 also includes insertion logic 640*b* for inserting Field B 610*b* into the packet bytes 610*b*. In this example, Field B 610*b* will not be modified again after stage 2, thus stage 2 is a practical point for inserting the updated value of Field B 610*b* into the packet bytes 612. In other cases, stage 3, or some later stage, may be more practical for inserting Field B 610*b* into the packet bytes 612. In some cases, the packet information 614 may direct the insertion logic 640*b*, for example by providing an offset and length that indicate where in the packet bytes 612 Field B 610*b* should be inserted. Alternatively or additionally, other values from the packet information 612 may also be inserted into the packet bytes 612.

Stage 2 also includes extraction logic 620*d* for extracting Field D from the packet bytes 612. The packet information 614 may provide information for extracting Field D, such as an offset and length that indicate where Field D can be found in the packet bytes 612. In this example, Field D is extracted in stage 2, rather than an earlier stage, because in this example the new value for Field D will be computed in stage 3. Field D could alternatively have been extracted in stages 1 or 2, though then the pipeline 600 would need additional staging flops to carry Field D from stage 1 to stage 2.

In some implementations, stage 2 could be implemented with the pipeline stage 200 illustrated in FIG. 2. Stage 2 of FIG. 6 includes insertion logic, extraction logic, and computation logic, and thus can be implemented using the methodology illustrated in FIG. 2.

Between stages 2 and 3 of FIG. 6, the pipeline includes another set of staging flops 632, 634*a*, 634*b*, 634*d*, 636. One set of staging flops 632 receives and carries forward the packet bytes 612, which are now modified to include the updated value of Field B 610*b*. Another set of staging flops 636 receives and carries forward the packet information 614, which was not, in this example, modified in stage 2. Another set of staging flops 634*a* receives the updated value of Field A 610*a*, and provides the new Field A 610*a* to stage 3. Another set of staging flops 634*b* receives the updated value of Field B 610*b*, which is still needed by the pipeline 600, and thus continues to be carried forward. Another set of staging flops 634*d* receives Field D from the extraction logic 620*d*, and provides Field D to stage 3.

Stage 3 includes computation logic 630*c* for computing the new value for Field D, using the updated values of Field A 610*a* and Field B 610*b*. In some cases, the computation logic 630*c* may also use values from the packet information 614 in computing the new value of Field D. In some implementations, stage 3 can be implemented, for example, using the pipeline stage 200 of FIG. 2, with only the computation logic and the insertion logic and extraction logic omitted. Alternatively, stage 3 of FIG. 6 can be implemented with all of the components of the pipeline stage 200, but with only the computation logic enabled.

In stage 3, the goal of updating Field D, using the updated values for Field A 610*a* and Field B 610*b* can be accomplished, without feedback or feedforward paths, and after having updated Fields A 610*a* and 610*b*. The updated value of Field D, however, still needs to be added to the packet bytes 612.

Between stages 3 and 4, the pipeline 600 includes staging flops 642, 644*a-b*, 646. One set of staging flops 642 receives the packet bytes 612 from stage 3, and provides the packet bytes 612 to stage 4. Another set of staging flops 646 receive and carry forward the packet information 614. These staging flops 646 may receive only the packet information 614 that is needed in subsequent stages of the pipeline 600, which may be less than all of the packet information 614 received by stage 3. Another set of staging flops 644a receives the updated value of Field A 610a. The updated value of Field A 610a has also not yet been added to the packet bytes 612, and thus is carried forward so that a later stage can execute the insertion. Another set of staging flops receives the updated value of Field D and provides Field D to stage 4. Field B 610b is not, at this point, carried forward, because it is no longer needed and has already been added to the packet bytes 612.

Stage 4 in this example includes insertion logic 640d for inserting Field D into the packet bytes 612. Inserting Field D into the packet bytes 612 typically overwrites the previous value of Field D in the packet bytes 612. This previous value was the value extracted in stage 2. The packet information 614 may provide information for inserting Field D into the packet bytes 612, such as for example an offset and length that indicate where in the packet bytes Field D should be inserted. In various implementations, stage 4 could be implemented using the pipeline stage 200 illustrated in FIG. 2. In these implementations, stage 4 of FIG. 5 may include the insertion logic and omit the extraction and computation logic. Alternatively, stage 4 could include the extraction and computation logic, and not use them.

Between stages 4 and 5, the pipeline 600 includes another set of staging flops 652, 654a, 656. One set of staging flops 652 receives and carries forward the packet bytes 612, which no longer include the updated value of Field D. Another set of staging flops 656 carries forward the packet information 614, which may include some or all of the packet information 614 received by stage 4. Another set of staging flops 654a receives the updated value of Field A 610a, and provides Field A 610a to stage 5. In this example, Field D need not be carried forward, since it has now been both updated and added to the packet bytes 612.

Stage 5 in this example includes insertion logic 640a for inserting the updated value of Field A 610a into the packet bytes 612. The packet information 614 may provide information for inserting Field A 610a into the packet bytes 612, such as for example an offset and length that indicate where in the packet bytes 612 Field A 610a should be inserted. Stage 5 provides the now modified packet bytes 616, which include the updated values of each of Fields A 610a, B 610b, and D, to the a next stage of logic in the network device. Stage 5 may also provide the packet information 614, which may include all or some of the packet information 614 received by stage 1. In this example, stage 5 does not provide any of the fields 610a, 610b, since the pipeline 600 has finished adding them to the packet bytes 612.

In an alternate implementation, the pipeline 600 may be configured to insert Field A 610a into the packet bytes 612 in stage 4, and to insert Field D into the packet bytes 612 in stage 5. The modified packet bytes 616 would be the same in this implementation, as in the illustrated implementation. It may be the case, however, that Field A 610a is easier to carry forward than Field D. For example, Field A 610a may be only eight bits in size, thus requiring only 8-bit wide staging flops 624a, 634a, 644a, 654a. Field D, on the other hand, may be 32 bits wide. In this example, the stage 4-to-stage 5 staging flops would include a 32-bit staging flop for Field D, instead of an 8-bit staging flop 654a for Field A.

FIG. 6 illustrates, by way of example, that dependencies between fields in a packet that need to be updated can be planned for. By understanding the dependencies—such as seeing that Fields A 610a and B 610b need to be calculated before Field D—and using the packet information 614, the operation of the stages in a pipeline can be planned to avoid the dependencies. For example, in this example, because Fields A 610a and B 610b are received in the packet information 614, the number and arrangement of the pipeline stages 602 is not restricted by when these fields 610a, 610b are available in the packet bytes 612. Furthermore, because Fields A 610a and B 610b are provided to stage 3 from the immediately preceding stage, the computation of Field D is not dependent on delays from routing these fields 610a, 610b over feedback or forwarding paths.

Additionally, Fields A 610a and B 610b can be inserted into the packet bytes 612 irrespective of when Field D is inserted into the packet bytes 612. Instead, in which stage these fields 610a, 610b are inserted into the packet bytes 612 may depend on other factors. For example, Field A 610a may reside in a table, and the latency caused by the table residing in a memory may affect in which stage Field A 610a is inserted.

A potential cost to the design of a pipeline such as is illustrated in FIG. 6 is the need for staging flops to carry data forward from stage to stage. This cost, however, can be minimized by, again, understanding the data dependencies. For example, fields in the packet information 614 that are not needed later in the pipeline 600 need not be carried forward, thus eliminating staging flops that would otherwise be used to carry these fields forward. Alternatively or additionally, when computing the updated value of a field is simple (such as for example a decrement or increment), the computation may be repeated in two or more pipeline stages. The original value and/or the updated value in this case need not be carried forward, thus also eliminating the need for staging flops.

Figure 7:
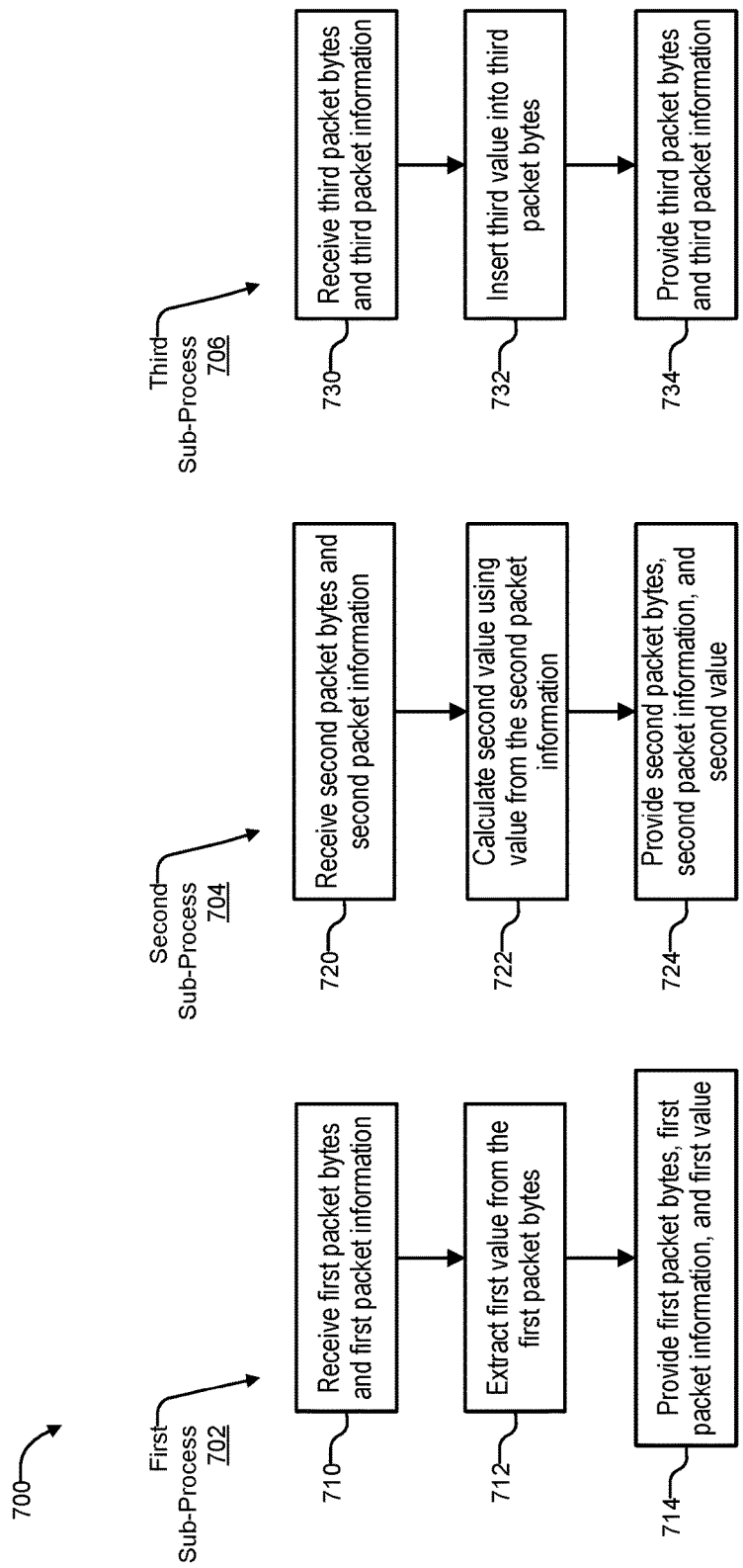
FIG. 7 illustrates an example of a method for implementing a packet rewriter that is capable of efficiently handling dependencies between the fields of packet that need to be modified.
Figure 8:
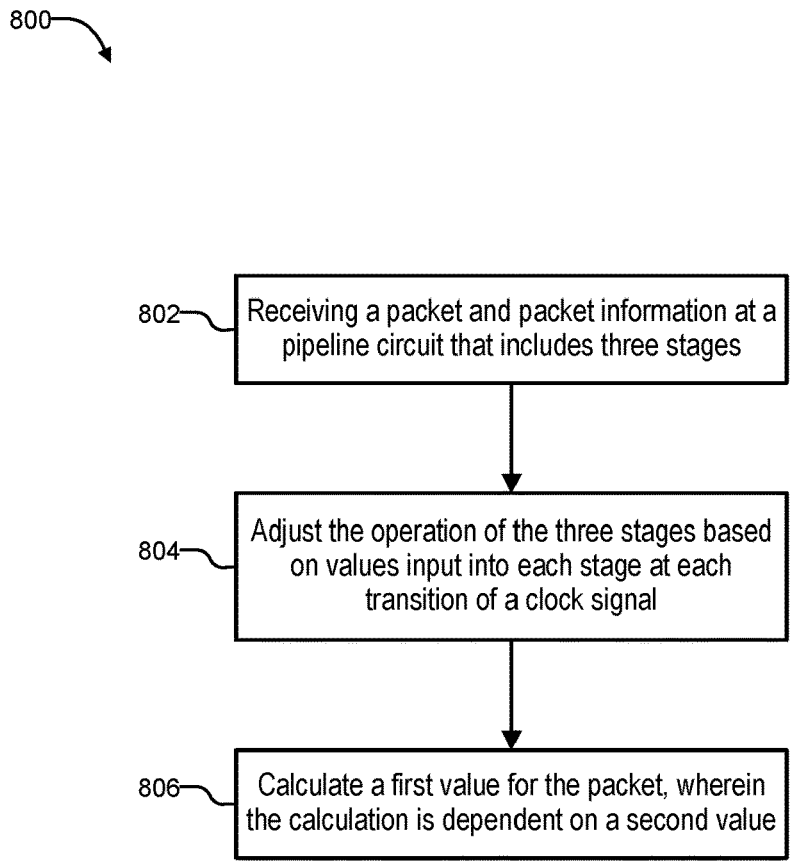
FIG. 8 illustrates an example of a process through which a packet rewriter can adjust the operation of its pipeline to manage dependencies that may occur when rewriting fields in a packet.

FIGS. 7-8 illustrate examples of methods for implementing a packet rewriter that is capable of efficiently handling dependencies between the fields of packets that need to be modified. These methods may be implemented by the systems described above, such as for example those illustrated in FIGS. 1, 5, and 6.

FIG. 7 illustrates an example of a process 700 through which a packet rewriter can update the fields in packet, where those fields may be dependent on the values of other fields in the packet. The process 700 may include three sub-processes 702, 704, 706. Each sub-process may be executed by a different stage in the packet rewriter's pipeline. For example, the first sub-process 702 may be executed by a first stage, the second sub-process 704, may be executed by a second stage, and the third sub-process 706 may be executed by third stage. These three stages may occur in any order (e.g., first, second, third; third, second, first; second, first, third, etc.). Alternatively or additionally, one or more stages may execute two or three of the sub-processes 702, 704, 706 at the same time, with each sub-process operating on different values in the same packet bytes and/or packet information.

In the first sub-process 702, at step 710, the packet rewriter may receive first packet bytes and first packet information at a first transition of a clock signal. The first packet bytes and first packet information may be received at a stage in the packet rewriter's pipeline. The first packet bytes may include some or all of the bytes from a first packet. The first packet information may include fields extracted from the first packet, such as for example the fields from a header or payload of the first packet. In some cases, the fields in the first packet information may have been modified from the values extracted from the first packet. The first packet bytes and first packet information may be received from other logic in the network device. Alternatively or additionally, the first packet bytes and first packet information may be received from another stage in the pipeline, where the first packet bytes and first packet information may have been operated on by one of the sub-processes 702, 704, 706.

At step 712 of the first sub-process 702, the packet rewriter may, in a pipeline stage, extract a first value from the first packet bytes. The pipeline stage may have an offset and a length for the first value, where the offset indicates at which bit (or byte) the first value can be found, while the length indicates how many bits (or bytes) to extract to obtain the first value.

At step 714 of the first sub-process 702, the packet rewriter may provide the first packet bytes, the first packet information, and the first value at a second transition of the clock signal. These values may be provided, for example, to a subsequent pipeline stage. Alternatively or additionally, these values may be provided to other logic in the network device.

In the second sub-process 704, at step 720, the packet rewriter may receive second packet bytes and second packet information at the first transition of the clock signal. The second packet bytes and second packet information may be received at a stage in the packet rewriter's pipeline. The second packet bytes and the second packet information may be the same, or mostly the same, as the first packet bytes and first packet information provided in step 714. Alternatively, the second packet bytes may be bytes from the first packet that are different than the first packet bytes, with second packet information being mostly or substantially similar. Alternatively, the second packet bytes and second packet information may be from a different, second packet, rather than from the first packet.

At step 722 of the second sub-process 704, the packet rewriter may, in a pipeline stage, calculate a second value using a value from the second packet information. The second packet information may include fields extracted from a packet. One of these fields may need to be updated, which may be accomplished in this step.

In some implementations, the packet rewriter may, at step 720, also receive an additional value at the first transition of the clock signal. In these implementations, at step 722, the packet rewriter may use the additional value in step 722 for calculating the second value, in addition to or instead of using the value from the second packet information. In some implementations, at step 722, the packet rewriter may insert the additional value into the second packet bytes. In some implementations, at step 722, the packet rewriter may do nothing with the additional value, and pass the additional value to step 724.

At step 724 of the second sub-process 704, the packet rewriter may provide the second packet bytes, the second packet information, and the second value at the second transition of the clock cycle. In some implementations, the packet rewriter may also provide the additional value described above. The values in step 724 may be provided, for example, to another stage in the packet rewriter's pipeline. Alternatively or additionally, the values may be provided to other logic in the network device.

In the third sub-process 706, at step 730, the packet rewriter may receive third packet bytes and third packet information at the first transition of the clock signal. The third packet bytes and the third packet information may be received at a stage in the packet rewriter's pipeline. The third packet bytes and the third packet information may be the same, or mostly the same, as the first packet bytes and first packet information provided in step 714. Alternatively, the third packet bytes and the third packet information may be the same, or mostly the same as the second packet bytes and second packet information provided in step 724. Alternatively, the third packet bytes may be bytes from the first packet that are different than the first packet bytes, with third packet information being mostly or substantially similar to the first packet information. Alternatively, the third packet bytes may be bytes from the second packet that are different than the second packet bytes, with the third packet information being mostly or substantially similar to the second packet information. Alternatively, the third packet bytes and third packet information may be from a different, third packet, rather than from the first packet or the second packet.

At step 732 of the third sub-process 706, the packet rewriter may insert, using a pipeline stage, a third value into the third packet bytes. The third value may be a field in the third packet information. The pipeline stage may have an offset and length for the third value. The offset may indicate at where in the third packet bytes to insert the third value, and the length may indicate how many bits (or byte) to insert.

At step 734 of the third sub-process, the packet rewriter may provide the third packet bytes and the third packet information at the second transition of the clock signal. These values may be provided, for example, to another stage in the packet rewriter's pipeline. Alternatively or additionally, these values may be provided to other logic in the network device.

FIG. 8 illustrates an example of a process 800 through which a packet rewriter can adjust the operation of its pipeline to manage dependencies that may occur when rewriting fields in a packet. The example process 800 can be implemented, for example, by the systems illustrated above.

At step 802, the packet rewriter may receive a packet and packet information at a pipeline circuit that includes three stages. In various implementations, the packet rewriter may use the pipeline to modify the fields of the packet. For example, the packet rewriter may update a time-to-live field in the packet, which may necessitate updating a checksum field in the packet. In various implementations, the pipeline may receive the packet in groups of bytes at a time. The pipeline may include at least three stages, where each stage may be operable to extract a value from packet bytes, calculate a value, and/or insert a value into the packet bytes.

The packet information may include values extracted from the packet, such as fields from a header of the packet. Alternatively or additionally, the packet information may include information determined for the packet.

At step 804, the packet rewriter may adjust the operation of the three stages based on values input into each stage at each transition of a clock signal. The packet rewriter may include a control circuit that can control the operation of each stage. Values input into each stage include packet bytes and the packet information for the corresponding packet, each received from the immediately preceding pipeline stage. The values input into each stage may also include values extracted and/or calculated in the immediately preceding stage.

The adjustment in step 804 may be made to accommodate dependencies between the fields in the packet. For example, for one network speed the number of packet bytes received at each clock transition may be different than the number of packet bytes received at a different network speed. As another example, similar fields, such as source and destination addresses, may be at different offsets in a packet for one packet type versus another packet type, and may also be a different length. An adjustment may include enabling or disabling the extraction, calculation, or insertion operation of a particular stage. Alternatively or additionally, an adjustment may include changing an extraction, calculation, or insertion operation, such as for example providing a different offset and length for an extraction.

At step 806, the packet rewriter may calculate a first value for the packet, wherein the calculation depends on a second value. The packet rewriter may use a particular stage to calculate the first value. In various implementations, the second value is provided by a stage previous to the stage being used to calculate the first value. In some cases, the second value may be extracted from the packet bytes. In other cases the value may be calculated, for example from a different value extracted from the packet, and/or from fields in the packet information.

In various implementations, once the first value has been calculated, the first value may be inserted into the packet bytes in a later stage of the pipeline.

Figure 9:
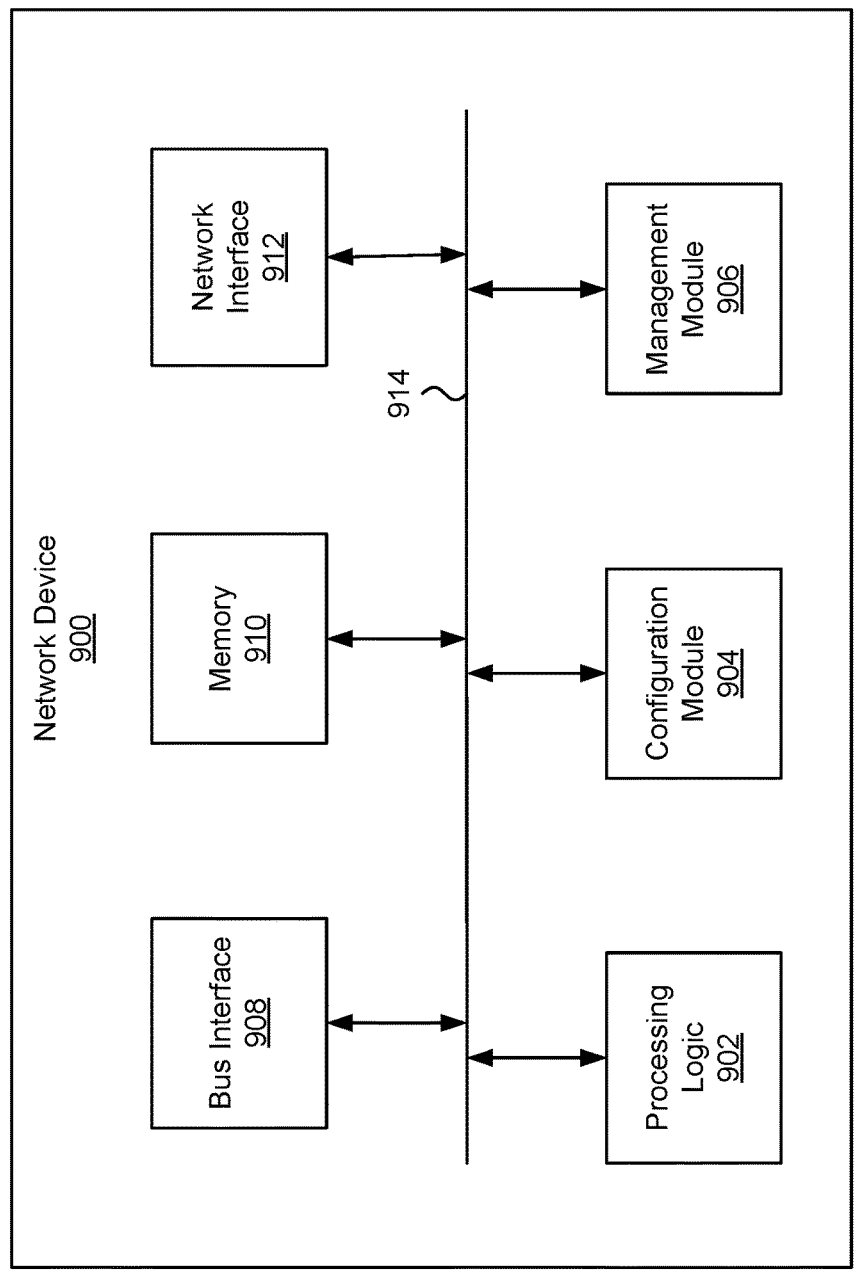
FIG. 9 illustrates an example of a network device, according to certain aspects of the disclosure.

FIG. 9 illustrates an example of a network device 900. Functionality and/or several components of the network device 900 may be used without limitation with other embodiments disclosed elsewhere in this disclosure, without limitations. A network device 900 may facilitate processing of packets and/or forwarding of packets from the network device 900 to another device. As referred to herein, a "packet" or "network packet" may refer to a variable or fixed unit of data. In some instances, a packet may include a packet header and a packet payload. The packet header may include information associated with the packet, such as a source, a destination, quality of service parameters, length, protocol, routing labels, error correction information, etc. In certain implementations, one packet header may indicate information associated with a series of packets, such as a burst transaction. In some implementations, the network device 900 may be the recipient and/or generator of packets. In some implementations, the network device 900 may modify the contents of the packet before forwarding the packet to another device. The network device 900 may be a peripheral device coupled to another computer device, a switch, a router or any other suitable device enabled for receiving and forwarding packets.

In one example, the network device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The network device 900 may include additional modules, not illustrated here, such as components discussed with respect to the nodes disclosed in FIG. 10. In some implementations, the network device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the network device 900, while in other cases some or all of the memory may be external to the network device 900. The memory 910 may store an operating system comprising executable instructions that, when executed by the processing logic 902, provides the execution environment for executing instructions providing networking functionality for the network device 900. The memory may also store and maintain several data structures and routing tables for facilitating the functionality of the network device 900.

In some implementations, the configuration module 904 may include one or more configuration registers. Configuration registers may control the operations of the network device 900. In some implementations, one or more bits in the configuration register can represent certain capabilities of the network device 900. Configuration registers may be programmed by instructions executing in the processing logic 902, and/or by an external entity, such as a host device, an operating system executing on a host device, and/or a remote device. The configuration module 904 may further include hardware and/or software that control the operations of the network device 900.

In some implementations, the management module 906 may be configured to manage different components of the network device 900. In some cases, the management module 906 may configure one or more bits in one or more configuration registers at power up, to enable or disable certain capabilities of the network device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the network device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 900 may include multiple network interface modules, each configured to communicate with a different network. For example, in these implementations, the network device 900 may include a network interface module for communicating with a wired Ethernet network, a wireless 802.11 network, a cellular network, an Infiniband network, etc.

The various components and modules of the network device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 10.

Figure 10:
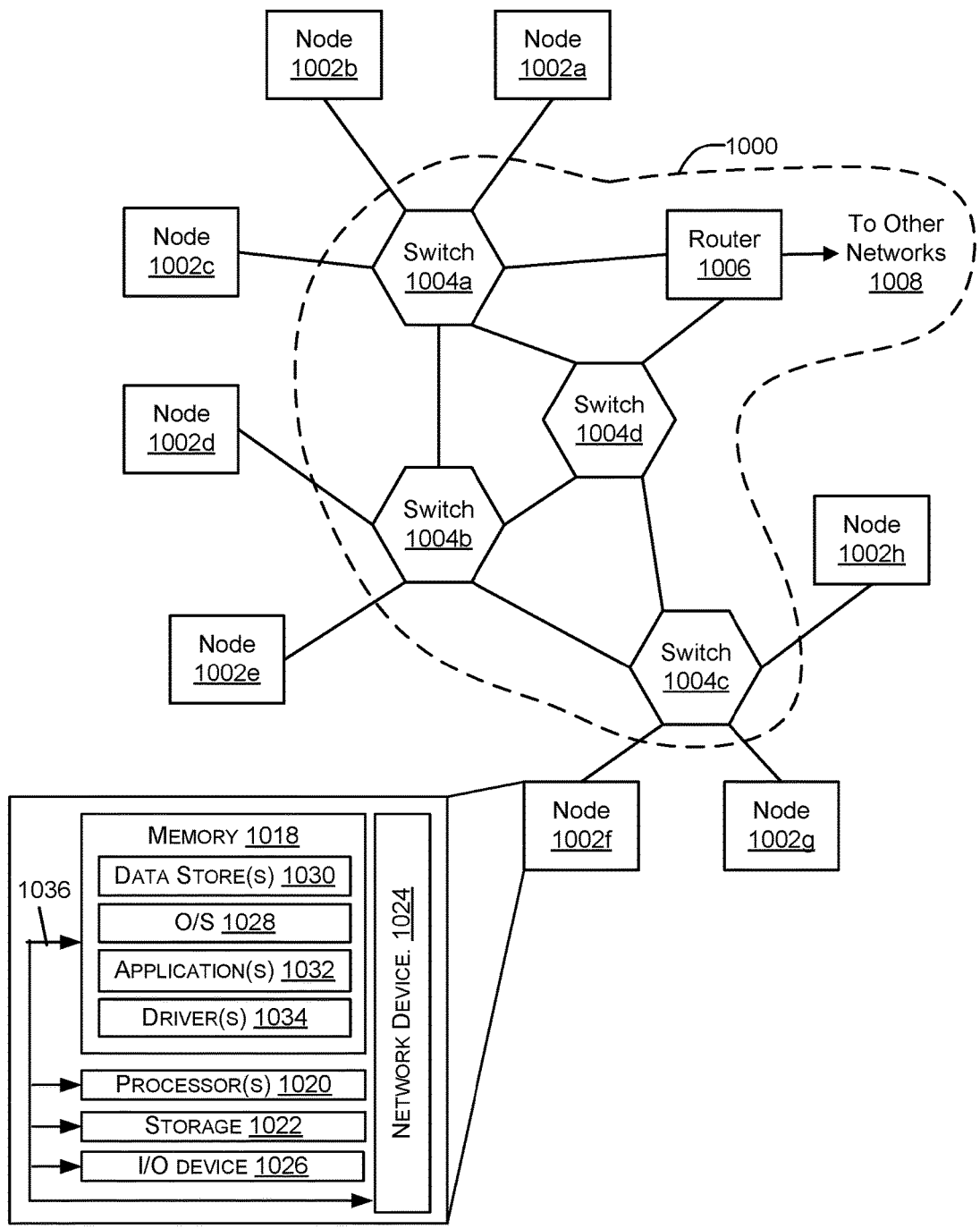
FIG. 10 illustrates an example architecture for features and systems described herein that includes one or more service provider computers and/or a user device connected via one or more networks, according to certain aspects of the disclosure.

FIG. 10 illustrates a network 1000, illustrating various different types of network devices 900 of FIG. 9, such as nodes comprising the network device, switches and routers. In certain embodiments, the network 1000 may be based on a switched architecture with point-to-point links. As illustrated in FIG. 10, the network 1000 includes a plurality of switches 1004a-1004d, which may be arranged in a network. In some cases, the switches are arranged in a multi-layered network, such as a Clos network. A network device 900 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more network devices 900 for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000. The network device(s) 1024 of FIG. 10 may include similar components discussed with reference to the network device 900 of FIG. 9.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 908 may implement NVMe, and the network device 1024 may be connected to a computing system using a PCIe interface.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit for a network device, comprising:
an input for receiving a clock signal; and
a plurality of pipeline stages, each pipeline stage including an instance of a same set of components, the same set of components comprising:
    an insertion circuit operable to insert a value into packet bytes received by the pipeline stage;
    an extraction circuit operable to extract a value from the packet bytes;
    a compute circuit operable to compute a value using values received by the pipeline stage; and
    a circuit operable to generate control signals, wherein the control signals enable or disable the insertion circuit, extraction circuit, and compute circuit for each cycle of the clock signal;
and wherein the plurality of pipeline stages include:
    a first pipeline stage operable to, at a first transition of the clock signal:
        receive first packet bytes for a packet and packet information associated with the packet, the packet information including values extracted from the packet; and
        determine control signals to enable a compute circuit of the first pipeline stage to compute a first value using a first field from the packet information, wherein all values required to compute the first value are available at inputs to the first pipeline stage;
    a second pipeline stage operable to, at a second transition of the clock signal:
        receive the first packet bytes, the packet information, and the first value from the first pipeline stage;
        determine control signals to enable a compute circuit of the second pipeline stage to compute a second value using a second field from the packet information, wherein all values required to compute the second value are available at inputs to the second pipeline stage;
        determine control signals to enable an insertion circuit of the second pipeline stage to insert the first value into the first packet bytes; and
        determine control signals to enable an extraction circuit of the second pipeline stage to extract a third value from the packet bytes;
    a third pipeline stage operable to, at a third transition of the clock signal:
        receive the first packet bytes, the packet information, the first value, the second value, and the third value from the second pipeline stage;
        determine control signals to enable a compute circuit of the third pipeline stage to compute a fourth value using the first value, the second value, and the third value, wherein all values required to compute the fourth value are available at inputs to the third pipeline stage;
    a fourth pipeline stage operable to, at a fourth transition of the clock signal:
        receive the first packet bytes, the packet information, the second value, and the fourth value from the third pipeline stage;
        determine controls signals to enable an insertion circuit of the fourth pipeline stage to insert the fourth value into the first packet bytes; and
    a fifth pipeline stage operable to, at a fifth transition of the clock signal:
        receive the first packet bytes, the packet information, and the second value from the fourth pipeline stage; and
        determine control signals to enable an insertion circuit of the fifth pipeline stage to insert the second value into the first packet bytes.

2. The integrated circuit of claim 1, wherein the second pipeline stage is further configured to:
receive an offset and a length; and
use the offset and the length to extract the third value from the first packet bytes.

3. The integrated circuit of claim 1, wherein the second pipeline stage is configured to:
receive an offset and a length; and
use the offset and the length to insert the first value into the first packet bytes.

4. An integrated circuit, comprising:
an input for receiving a clock signal; and
a plurality of pipeline stages, each pipeline stage including an instance of a same set of components, the same set of components comprising:
    an insertion circuit operable to insert a value into packet bytes received by the pipeline stage;
    an extraction circuit operable to extract a value from the packet bytes;
    a compute circuit operable to compute a value using values received by the pipeline stage; and
    a circuit operable to generate control signals, wherein the control signals enable or disable the insertion circuit, extraction circuit, and compute circuit for each cycle of the clock signal;
and wherein the plurality of pipeline stages include:
    a first pipeline stage configured by control signals of the first pipeline stage to, in a first cycle of the clock signal, extract a first value from first packet bytes received by the first pipeline stage, wherein the first value is required to compute a second value;
    a second pipeline stage configured by control signals of the second pipeline stage to, in a second cycle of the clock signal, calculate the second value using the first value, wherein all values required by the second pipeline stage to compute the second value are available at inputs to the second pipeline stage; and
    a third pipeline stage configured by control signals of the third pipeline stage, in a third cycle of the clock signal modify the first packet bytes by inserting the second value into the first packet bytes.

5. The integrated circuit of claim 4, wherein the second pipeline stage is further configured by the control signals of the second pipeline stage to calculate the second value using the first value and a value from packet information associated with the first packet bytes, wherein the packet information is received by the second pipeline stage concurrently with the first packet bytes and the first value.

6. The integrated circuit of claim 4, wherein the second pipeline stage is further configured by the control signals of the second pipeline stage to insert a third value into the first packet bytes, wherein the third value is received by the second pipeline stage concurrently with the first packet bytes and the first value.

7. The integrated circuit of claim 4, wherein the second pipeline stage is further configured by the control signals of the second pipeline stage to provide a third value unmodified to a subsequent pipeline stage from the plurality of pipeline stages, wherein the third value is received by the second pipeline stage concurrently with the first packet bytes and the first value.

8. The integrated circuit of claim 4, wherein the second pipeline stage is further configured by the control signals of the second pipeline stage to extract a third value from the first packet bytes in a concurrent clock cycle with computing the second value.

9. The integrated circuit of claim 4, wherein the first pipeline stage is operable to extract the first value from a header or a payload of the first packet bytes.

10. The integrated circuit of claim 4, wherein the third pipeline stage is operable to insert the second value into a header or a payload of the first packet bytes.

11. The integrated circuit of claim 4, wherein the plurality of pipeline stages further include:
a fourth pipeline stage between the first pipeline stage and the second pipeline stage, wherein the fourth pipeline stage is configured by control signals of the fourth pipeline stage to provide the first value unmodified to the second pipeline stage.

12. The integrated circuit of claim 4, wherein the plurality of pipeline stages further include:
a fourth pipeline stage between the second pipeline stage and the third pipeline stage, wherein the fourth pipeline stage is configured by control signals of the fourth pipeline stage to provide the second value unmodified to the third pipeline stage.

13. The integrated circuit of claim 4, wherein the first value is extracted from a field in a header of the first packet bytes.

14. The integrated circuit of claim 4, wherein the integrated circuit is an Application Specific Integrated Circuit (ASIC), a Field Programmable Logic Array (FPGA), or a System on a Chip (SoC).

15. A method of operating an integrated circuit, comprising:
extracting, at a first pipeline stage, a first value from first packet bytes received by the first pipeline stage, wherein the first value is required to compute a second value, wherein the integrated circuit includes a plurality of pipeline stages, wherein each pipeline stage includes an instance of a same set of components comprising an insertion circuit, an extraction circuit, a compute circuit, and a circuit operable to generate control signals, wherein each pipeline stage is configurable by the control signals of the pipeline stage to insert a value into packet bytes received by the pipeline stage, extract a value from the packet bytes, or compute a value using values received by the pipeline stage, and wherein the first pipeline stage is configured by control signals of the first pipeline stage to extract the first value;
calculating, at a second pipeline stage, the second value using the first value, wherein the second pipeline stage is configured by control signals of the second pipeline stage to calculate the second value, and wherein all values required by the second pipeline stage to compute the second value are available at inputs to the second pipeline stage; and
inserting, at a third pipeline stage, the second value into the first packet bytes, wherein the third pipeline stage is configured by control signals of the third pipeline stage to insert the second value.

16. The method of claim 15, wherein the second value is further calculated by the second pipeline stage using a third value, wherein the second pipeline stage receives the third value concurrently with the first value and the first packet bytes.

17. The method of claim 15, further comprising:
inserting, at the second pipeline stage, a third value into the first packet bytes, wherein the second pipeline stage receives the third value concurrently with the first value and the first packet bytes.

18. The method of claim 15, further comprising:
providing, at the second pipeline stage, a third value unmodified to a subsequent pipeline stage, wherein the second pipeline stage receives the third value concurrently with the first value and the first packet bytes.

19. The method of claim 15, further comprising:
extracting, at the second pipeline stage, a third value, wherein the second pipeline stage extracts the third value in a concurrent clock cycle with calculating the second value.

20. The method of claim 15, wherein operations within each of the first pipeline stage, the second pipeline stage, and the third pipeline stage use only values provided by an immediately preceding pipeline stage.

21. The integrated circuit of claim 4, wherein each pipeline stage determines the control signals using the packet bytes.

22. The method of claim 15, wherein the control signals of the first pipeline stage determine a location within the first packet bytes from which to extract the first value.

23. The method of claim 15, wherein the control signals of the third pipeline stage determine a location within the first packet bytes into which to insert the second value.

* * * * *